US012631030B2

(12) United States Patent　　　　　(10) Patent No.:　US 12,631,030 B2
Whitehead　　　　　　　　　　　　　　(45) Date of Patent:　May 19, 2026

(54) DECORATIVE PLASTIC PANEL AND METHOD OF FABRICATING DECORATIVE PLASTIC PANELS

(71) Applicant: Suncast Technologies, LLC, Palm Beach Gardens, FL (US)

(72) Inventor: Stephen Whitehead, Elgin, IL (US)

(73) Assignee: SUNCAST TECHNOLOGIES, LLC, Palm Beach Gardens, FL (US)

( * ) Notice: Subject to any disclaimer, the term of this patent is extended or adjusted under 35 U.S.C. 154(b) by 252 days.

(21) Appl. No.: 18/304,649

(22) Filed: Apr. 21, 2023

(65) Prior Publication Data

US 2024/0352745 A1　　Oct. 24, 2024

(51) Int. Cl.
　　*E04F 13/18*　　　(2006.01)
　　*B29C 49/00*　　　(2006.01)
　　*B29C 49/04*　　　(2006.01)
　　*B29L 24/00*　　　(2006.01)
　　*B29L 31/00*　　　(2006.01)
(52) U.S. Cl.
　　CPC ........ *E04F 13/185* (2013.01); *B29C 49/0005* (2013.01); *B29C 49/04* (2013.01); *B29K 2995/0021* (2013.01); *B29L 2024/00* (2013.01); *B29L 2031/722* (2013.01)
(58) Field of Classification Search
　　CPC .... E04F 13/185; B29C 49/0005; B29C 49/04; B29K 2995/0021; B29L 2024/00; B29L 2031/722
　　See application file for complete search history.

(56) References Cited

U.S. PATENT DOCUMENTS

| | | | |
|---|---|---|---|
| 3,562,379 A | | 2/1971 | Duggins |
| 3,582,426 A | * | 6/1971 | Meissner ................ B32B 27/00 |
| | | | 156/306.6 |
| 4,085,246 A | | 4/1978 | Buser et al. |
| 4,544,584 A | | 10/1985 | Ross et al. |
| 5,304,592 A | | 4/1994 | Ghahary |
| 5,465,544 A | | 11/1995 | Ghahary |
| 5,476,895 A | | 12/1995 | Ghahary |
| 5,628,949 A | | 5/1997 | Bordener |

(Continued)

FOREIGN PATENT DOCUMENTS

| | | |
|---|---|---|
| JP | 2002104857 | 4/2002 |
| JP | 2007530411 | 11/2007 |

(Continued)

*Primary Examiner* — Chi Q Nguyen
(74) *Attorney, Agent, or Firm* — McHale & Slavin, P.A.

(57)　　　　　　ABSTRACT

An additive system for use in a polymeric formulation (plastic) that includes a plurality of visually differentiable elongated streaks contained in a mono-colored base, the visually differentiable elongated streaks are composed of a pigmented material having a random pattern and elongated due to the manufacturing process. The visually differentiable streaks are composed of at least two colors, each having a pigment shade visually differing from one another. The visually differentiable streaks are elongated and randomized during the manufacturing process to resemble the elongated markings present in natural materials such as marble or wood. The visually differentiable markings can be utilized in various color combinations to make lightweight useful articles having a pleasing aesthetic appearance.

11 Claims, 9 Drawing Sheets

(56) References Cited

U.S. PATENT DOCUMENTS

| | | | | |
|---|---|---|---|---|
| 5,702,558 | A * | 12/1997 | Schadel | B32B 27/365 |
| | | | | 156/289 |
| 5,885,503 | A | 3/1999 | Bordener | |
| 6,458,743 | B1 * | 10/2002 | Menin | B41M 5/035 |
| | | | | 503/227 |
| 6,517,897 | B1 | 2/2003 | Bordener | |
| 6,548,157 | B2 | 4/2003 | Ghahary | |
| 9,469,990 | B2 * | 10/2016 | Dirkson | B27G 1/00 |
| 9,592,693 | B2 * | 3/2017 | Priante | B41M 5/025 |
| 10,889,046 | B2 | 1/2021 | Anderson et al. | |
| 11,383,419 | B2 | 7/2022 | Anderson et al. | |
| 11,498,241 | B2 * | 11/2022 | MacDonald | B28B 3/021 |
| 2004/0126571 | A1 | 7/2004 | Bordener | |
| 2004/0163757 | A1 * | 8/2004 | Peng | E04F 13/0885 |
| | | | | 156/212 |
| 2006/0003144 | A1 * | 1/2006 | Kaump | E04C 2/043 |
| | | | | 428/156 |
| 2008/0216446 | A1 * | 9/2008 | Lobson | E04F 13/0891 |
| | | | | 52/745.21 |
| 2009/0056257 | A1 * | 3/2009 | Mollinger | B44F 9/04 |
| | | | | 52/309.4 |
| 2009/0282764 | A1 * | 11/2009 | Hendricks | E04F 13/185 |
| | | | | 52/311.1 |
| 2011/0049766 | A1 * | 3/2011 | Del Mundo | B41M 5/36 |
| | | | | 524/1 |
| 2011/0185662 | A1 | 8/2011 | Mollinger et al. | |
| 2011/0316199 | A1 * | 12/2011 | Rosati | E04G 11/48 |
| | | | | 249/219.1 |
| 2018/0071969 | A1 | 3/2018 | Anderson et al. | |
| 2021/0069959 | A1 | 3/2021 | Anderson et al. | |
| 2022/0242032 | A1 | 8/2022 | Anderson et al. | |

FOREIGN PATENT DOCUMENTS

| | | |
|---|---|---|
| KR | 20090085819 | 8/2009 |
| KR | 20100020779 | 2/2010 |
| WO | WO2010101372 | 9/2010 |
| WO | WO2011078476 | 6/2011 |

* cited by examiner

DECORATIVE PLASTIC PANEL AND METHOD OF FABRICATING DECORATIVE PLASTIC PANELS

FIELD OF THE INVENTION

The invention relates to decorative plastic panels and, more specifically, to a plastic panel that includes elongated visible streaks of different colors that have the appearance of marble or wood. The present invention also pertains to methods for producing plastic articles with decorative attributes.

BACKGROUND OF THE INVENTION

In the plastics formulation and application industry, the area of plastics material with decorative attributes can be broadly categorized into three main categories: 1) materials employed in the solid surface industry; 2) spray process variants of plastics materials; and 3) various materials employed in applications such as plastic utility panels.

Solid surface panels have been in existence since their invention and introduction by DuPont in the 1960's. Examples of such materials are those commercially available under the trade name Corian.RTM.. Such materials are typically comprised of translucent thermoset resins with polygonal granules of crushed ingot suspended therein. The ingot material is made from monolithic castings of thermoset resin together with coloration and high loadings of a suitable mineral, such as ATH (alumina trihydrate).

Examples of materials with an excellent stone-like appearance are relatively abundant when using thermoset materials and polygonal granules typical of the relevant art and as described above; solid surface materials such as the Corian materials, as well as various materials such as those disclosed in various references, such as U.S. Pat. No. 3,562,379 to Duggins or U.S. Pat. No. 4,085,246 to Buser et al., U.S. Pat. No. 4,544,584 to Ross et al., U.S. Pat. Nos. 6,548,157, 5,476,895 and 5,304,592 to Ghahary, and U.S. Pat. Nos. 5,628,949, 5,885,503, and 6,517,897 to Bordener, etc. While these materials exhibit excellent stone-like appearances, they require the use of high-clarity thermosetting materials as the base media resin. Each of these references teach materials that employ granules having an average aspect ratio of 1. Granules having such aspect ratios and configurations render only one or two small planes of the surface of the granule visible to the viewing surface of the sheet or resulting article. Therefore, typically less than 20% of the granule surface is visible from the viewing surface of the sheet or resulting article. The relatively small ratio of surface area to volume (the polygonal granules resemble spheres, which are by definition a geometric minimum of surface area to volume) is a key reason for the required use of high clarity thermoset media resin.

U.S. Pat. No. 6,548,157 to Ghahary is directed to a three layer laminate in which the outer layer comprises a filled crosslinked polyester layer, which has a stone-like appearance. The stone-like outer layer is generally a crosslinked unsaturated polyester resin in which the cross linking is achieved by copolymerization with an aromatic monomer, which generally is styrene or at least contains styrene and which contains in addition to some inorganic filler, granules which themselves are crosslinked resin containing inorganic fillers and which have the same density as the matrix resin. The granules can be made from polyester resins, epoxy resins or acrylic resins.

U.S. Pat. No. 5,476,895 to Ghahary discloses sprayable granite-like coating compositions comprising a polyester matrix resin which contains a particulate crosslinked resin containing an inorganic filler and an additive, which equalizes the density of the particles to that of the matrix, distributed throughout the matrix. The particles are immiscible and visually differentiable and provide the granite-like appearance of the outer layer.

U.S. Pat. No. 5,304,592 to Ghahary, teaches a coloring effect achieved with visibly differentiable plastic granules made from a combination of thermoset and thermoplastic resins that are isopynic in density with the thermoplastic base resin in which they are distributed. These are discrete non-melting granules and are typical granules utilized in solid surface formulations in the industry. The granules are mixed into a thermoplastic base material to provide a stone-like coloring effect for injection molding products such as flowerpots, computer housings, and the like.

The various Ghahary references fail to provide an effective method for producing panel-like material having a complex color system resembling an aesthetic three-dimensional visual effect in materials other than high-clarity resin media. Thus, the various Ghahary references teach a conventional, three-dimensional-appearing coloring system that relies upon prior art ingot-based granules. These granules are limiting in that they typically require a stratum thickness of 0.050 inch or more, are poorly suited for extrusion and thermoforming operations, and create styrene emissions in the ingot manufacturing process itself. Further, these granules render any polymer system they are extruded into unrecyclable, and the roundish granules require the use of high clarity media resin.

It is believed that the substitutive step of replacing standard solid surface thermoset resin with thermoplastic media while utilizing a granule with an aspect ratio of 1 leaves a product with insufficient visible surface to the granule to yield an appearance of natural stone. The materials disclosed in Ghahary, Ross, Buser, and as currently commercially available from R. J. Marshall Company of Southfield, Michigan, do not perform well in thermoplastic resin and yield extremely poor results in extrusion and thermoforming processes in general. Additionally, these materials are generally not conducive to thermoforming post-manufacturing processes due to brittleness and lack of a smooth finish upon thermoforming due to the rigid nature of the granules.

Typically, the pigmenting systems currently utilized in the solid surface industry employ visually differentiable decorative granules achieving an opaque color over a relatively thick dimension, i.e., the granules themselves have an aspect ratio of approximately 1. Use of an opaque or even semi-translucent base media resin allows only objects adjacent to or very near the surface to be seen. As used herein, "media resin" refers to the polymeric material in which the granules reside. Hence, the granules desired in the aforementioned references create a coloring system in which granules distant from the surface are only visible as tiny dots. Such visual appearance is an incomplete or poor representation of natural stone when observed in strata less than approximately 0.050" thick. Furthermore, the ability to form a three-dimensional color effect with a thermoplastic or thermosetting base resin, while attempted previously, has not produced a process or material that addresses problems such as particle migration or settling over time. Additionally, the ability to create a thermoplastic sheet of appropriate physical quality and appearance has been problematic.

Spray process variants of solid surface materials are also known in the art and may be typified by the disclosure contained in U.S. Pat. Nos. 5,465,544 and 5,476,895 to Ghahary. Such spray process application materials are still dependent on granule formulations such as those broadly disclosed previously. Examples of such granule formulations and manufacturing examples are disclosed variously in references such as U.S. Pat. No. 4,544,584 to Ross et al., and U.S. Pat. No. 6,517,897 to Bordener.

Thermoset materials have other drawbacks as well. These include issues such as material brittleness that can impair material performance life and the like. Thermoset materials can also have relatively high material costs, as well as require high processing costs to provide the desired product. Additionally, the thermosetting nature of the polymeric material severely limits thermoforming options. Finally, thermoset materials of the nature contemplated and discussed are difficult to successfully form into an extremely thin veneer. Such thin veneer can be desirable in various applications.

Spray process solid surface materials are based upon standard solid surface chemistry, with appropriate care taken in particle packing of the decorative granules to ensure the desired visual effect in a dimension much thinner than that achieved in prior solid surface materials, as well as appropriate thixotropic, wetting and air release additives. Thicknesses on the order of 0.050 inch can be produced using spray application processes in contrast to the ½ inch thicknesses necessary in typical solid surface formulations. A difficulty in handling prior art granules in liquid resin media is the tendency of residual catalyst on the granule surface to catalyze the liquid resin media prematurely; in addition, the granules themselves are typically made from reacted thermoset resin and are therefore chemically un-reactive to effect any chemical bond in the (typically thermoset) media resin.

Typically, in both spray process solid surface and non-spray process solid surface materials, granules utilized are polygonal, typically homogenous and substantially spherical in shape with an average aspect ratio of approximately 1. Such granules are relatively heavy with a specific gravity of 1.4 to 1.8. They are very rigid and sharp, and abrasive to process equipment. The granules are suspended in a translucent or clear thermoset media resin with the visible granules randomly distributed and oriented to create very pleasing appearance with a striking resemblance to natural stone. Much experience and skill relating to thixotropic additives, wetting and air dispersion agents is necessary to keep such heavy roundish granules in suspension.

The third category of decorative plastics, utility panels, may generally utilize thermoplastic materials to produce various uses and constructions. Typical panels range from 0.060" to 0.75" thick and are generally made to a planar nominal dimension such as four feet by eight feet in width and length or the like. The panel will typically be colored to produce a pleasing appearance to further whatever market application it may be intended for. Panels produced according to methods disclosed in the relevant art utilize coloration that is typically substantially homogeneous in nature, yielding a flat single color panel. Such materials may be marketed as "marine panels" or "utility panels" due to their robust physical properties, waterproof nature, and plain appearance. Such opaque colored panels are rarely used for anything except dock trim, live well construction in boats, utility wall cladding, service station wall cladding, and other low economic value applications.

One example of a typical utility panel material composed of thermoplastic polymers is a coextruded material having a foamed center core. Examples of such materials are those marketed under the trade name SEABOARD.RTM.. Advantages of materials made via this process are greatly reduced cost compared to typical solid surface materials, relatively light-weight, and robust physical properties. Disadvantages of such thermoplastic materials exemplified by this product are flat, 2-dimensional coloration with no significant resemblance to natural stone.

Various injection-molded panels are also known. However, the resulting materials are again homogenous in construction. Since this is a thermoplastic material, no conventional solid surface granule can be easily employed due to concerns about cost, equipment wear, visibility of the granule in situ, and relative bond strength between the granule and the plastic media resin, and the fact that the granules themselves will take up a considerable amount of space in any polymer sheet to be made.

Typically, in the decorative plastics industry, sheet material is often defined as having thicknesses greater than approximately 0.1 inch. With solid surface materials, available sheet thicknesses are at least ¼" and most typically ½" in order to provide sufficient strength and impact resistance for material handling and shipping. However, there is a growing desire to provide materials having thicknesses as low as 0.05 inches or less, as is typical of veneers in other building material markets. Such materials would provide significant advantages regarding reductions in overall material cost, shipping cost, weight reduction, thermoformability, and the like.

Early attempts to make thin veneers featuring a good stone-like appearance utilized two basic methodologies. The first was U.S. Pat. No. 5,628,949 to Bordener, originally commercialized under the trade name Korstone.RTM.. This is a spray-process solid surface which created a two-layer solid surface composite that is able to be molded into various shapes, etc. The second was a product marketed under the trade name SSV.TM., by the Ralph C. Wilson Co. of Temple, Texas. The process disclosed therein involved taking a solid surface formulation, as generally described therein, and extruding it into a thinner sheet of approximately 0.090". The material produced by this process exhibited high percent breakage on production (thermoset materials are typically too brittle to be cast so thin) and very poor physical performance upon installation over rigid substrates such as countertop applications. While the process disclosed in Bordener '949 was successful both physically and in the market, it did not address the broadest channel of the market—the pre-cast sheet. Bordener '949 (and other related patents by the same inventor) are best utilized to make pre-cast shaped articles, where the largest market segment in solid surface material is pre-cast sheet stock.

The present invention addresses the weaknesses of the technologies disclosed variously in Bordener '949, Ross '584, the various Ghahary references, and various commercialized materials, including lack of flexibility, weight, cost, deficiencies in visual depth and degree of the stone-effect, thermoformability and UV stability. Additionally, the relevant art materials disclosed require processing methods that have significant levels of cost and environmental impact.

U.S. Pat. No. 5,465,544 to Ghahary discloses a compression molded facing to cover the face of a concrete block. The mixture includes a matrix of plastic filled with various fiberglass and colored materials that are immiscible in the matrix to form a granite appearance.

Some of the hallmark problems of prior art methods of creating a three-dimensional color effect by means of positioning pre-hardened discrete granules in situ in any liquid plastic resin media include granule migration, exposure of the granule to the viewing surface, and compatibility of the granules with the manufacturing process. In thermoset manufacturing processes, these manufacturing problems may be addressed with tight process controls pertaining to such properties as viscosity, mold cavity fill rates, and flow control. Furthermore, specialized chemistry is typically required utilizing materials such as thixotropic, buoyancy and molecular stabilizing additives such as fumed silica, specialized wetting, and coupling agents. Such process controls add significantly to the cost of a product, both by direct ingredient cost, and also in specialized equipment costs and the cost of skilled labor to run and control such processes. Production of suitable panel stock utilizing prior art granules with an average aspect ratio of 1 often requires abrasive planing of at least one panel surface to allow a good view of the three-dimensional granules, and to permit a large enough plane (preferably to bisect an individual granule to create a hemi-granule) of the polygonal granule to be clearly visible. This planing typically removes from {fraction (¹⁄₁₆)}" to {fraction (³⁄₁₆)}" material off one plane of the entire sheet, which, in the case of a veneer material, equates to a 50% material loss. Further, this planing is typically most successful with more expensive thermoset-based resin chemistry. Given characteristics in planing techniques, thermoset-based resin formulations have been preferred to withstand the necessary brittleness and heat resistance required for abrasive planing so that the panel itself does not melt during this energy-intensive process. Another difficulty in such systems is the relative incompatibility of traditional rigid granules with respect to their abrasiveness and their relative thickness to a thin sheet since the granules have an average aspect ratio of 1 and their abrasive nature to thermoplastic extrusion and extrusion blow molding process tooling.

There exists a long-felt need for plastic materials having satisfactory aesthetic appearances, especially those with a visual stone-like appearance. This has been difficult to achieve in an efficient and economical manner, particularly in situations where a thin veneer is required. Thus, it is highly desirable to provide a plastic material having high aesthetic value. It is also desirable, in certain instances, to provide a thermoplastic panel having high aesthetic value color effects. While this has been accomplished to a certain extent with prior art thermoset resins in thick panel material, plastic materials which can be formed into various thin veneer applications, such as extrusion blow molded panels, tend to exhibit disappointing performance with respect to basic physical properties necessary to allow the material to be made into thin sheets or veneers having necessary structural properties or appearance. This appearance has been difficult to achieve with commodity grade material such as thermoplastic resins, especially olefins and the like. It is also desirable to achieve special appearances in plastics while reducing or eliminating emissions of such processes and to improve the recyclable nature of such materials.

Thus it would be desirable to provide a coloring system and associated thermoplastic-based material that addresses one or more of these shortcomings. Additionally, it is desirable to have a coloring system and plastic material capable of being processed using equipment such as existing extrusion blow molding and injection molding equipment in a manner that requires minimal equipment modification. It is also desirable that the plastic material exhibit three-dimensional aesthetic effect with reduced pigment loading requirements and improved color control of the materials employed. It is also desirable that the plastic material be thermoformable as desired or required, with smooth or textured surface characteristics after thermoforming, and exhibit minimal material brittleness. Further, it is desirable that the material formulation be producible in a very thin veneer that retains the full aesthetic affect, such as those associated with extrusion blow molding. Finally, it is also desirable to provide a process that creates a plastic material with a stone-like color effect for use in a wide variety of applications including countertops, shed panels, fence panels, deck box panels and the like.

SUMMARY OF THE INVENTION

The present invention addresses the shortcomings outlined in the various relevant art references, and is broadly directed to a method and composition of plastic material composed of a polymeric resin material and a coloration system to provide random elongated streaks in an extruded or extruded blow molded component that resembles stone or wood. The coloration system and method for forming parts is compatible with low cost thermoplastic resins and known low cost extrusion and extrusion blow molding processes.

Accordingly, it is an objective of the present invention to provide a plastic article that includes the coloration of wood or stone.

It is a further objective of the present invention to provide a plastic panel that includes a surface coloration including elongated random streaks.

It is another objective of the present invention to provide a hollow panel having thin walls that includes surface coloration that resembles wood or stone.

It is yet another objective of the present invention to provide a hollow panel having surface coloration that resembles wood or stone and tack offs to provide rigidity to the panel.

It is a still further objective of the invention to provide a combination of plastic pellets that can be fed through an extruder to create random elongated streaks at least on an outer surface of a plastic panel.

It is still yet another objective of the present invention to provide an extruded and blow molded panel that includes more than one layer of plastic, the top layer including the streaks while the other layer(s) may be devoid of streaks.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
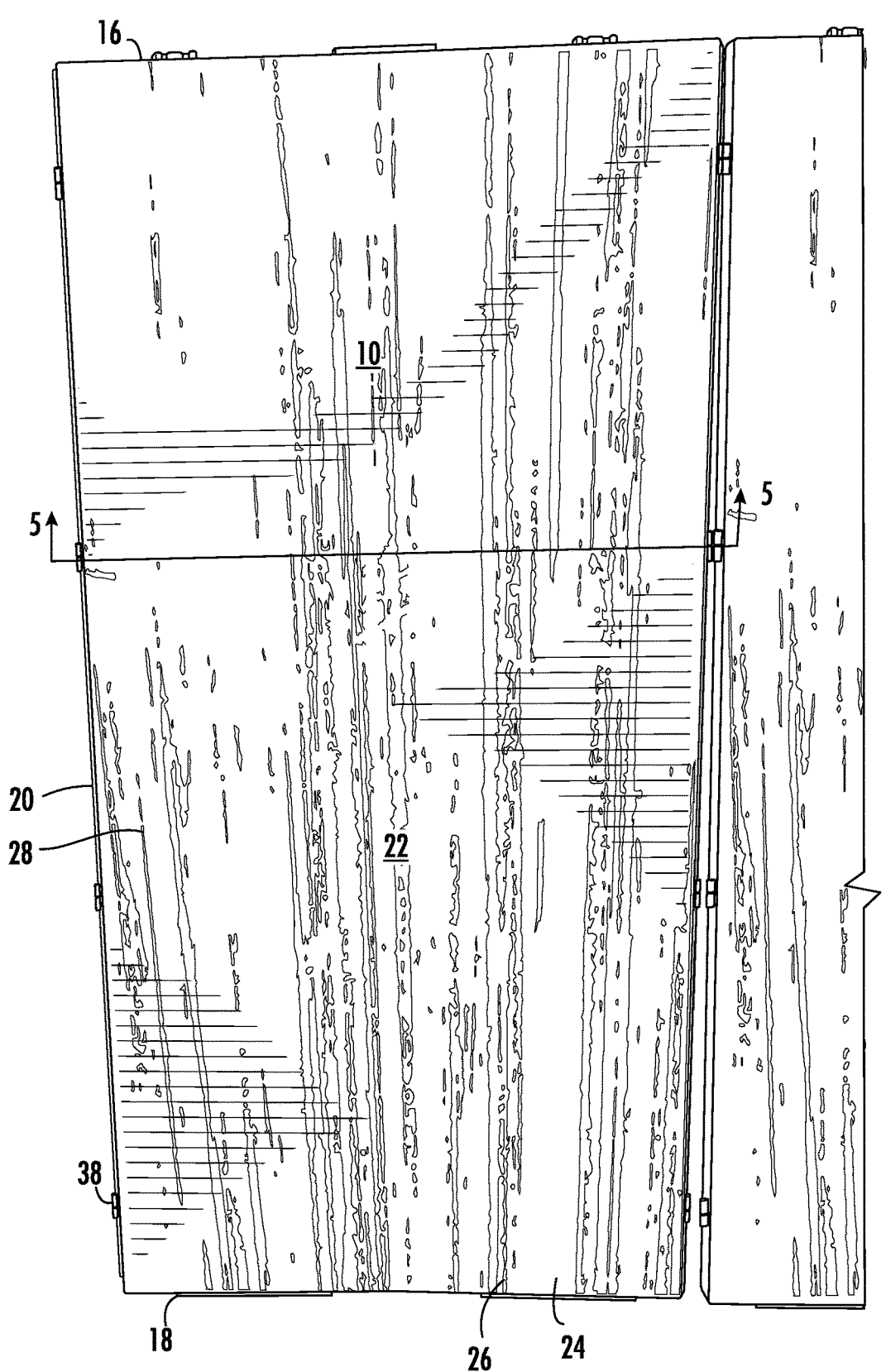
FIG. 1 is a front view of a wall panel for a shed, illustrated with integrally formed connections on each side for connection to other panels.
Figure 2:
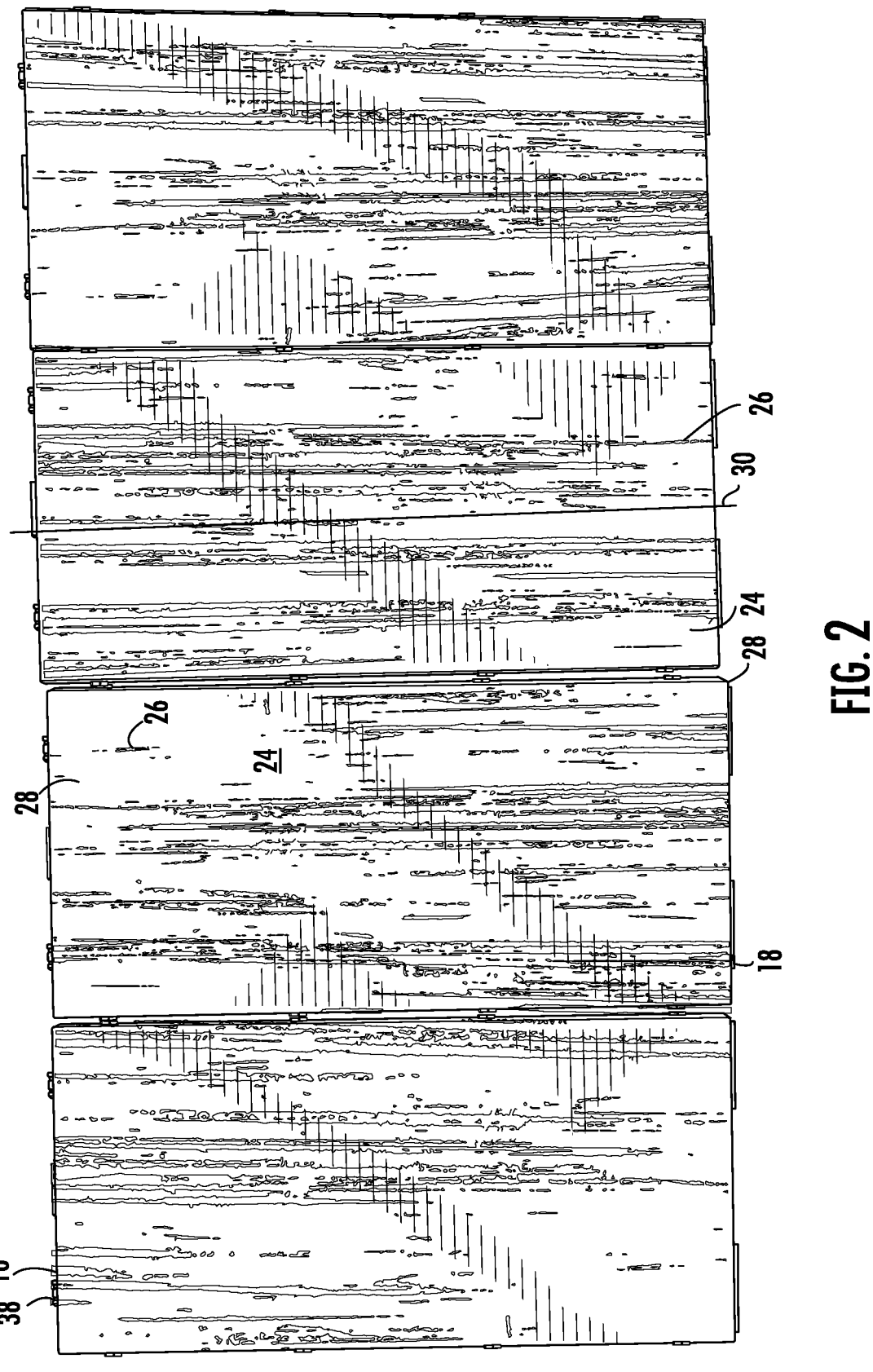
FIG. 2 is a front view of a plurality of extrusion blow molded panels illustrating the random pattern produced by the present method.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-9, a decorative plastic panel 100 resembling stone is illustrated. The plastic panel 100 is preferably formed as a hollow panel having a front wall 10, a rear wall 12, a pair of side walls 14, a top end wall 16, and a bottom end wall 18. The walls are integrally joined along their respective edges 20 to construct the hollow panel. An outer surface 22 of each wall includes a decorative layer of plastic that includes at least two visibly differentiable colors; a first color 24 being a base color forming a preponderance of the decorative layer, and a second color 26 forming elongated streaks, the elongated streaks extending parallel to a longitudinal axis of the decorative panel and each elongated streak having different lengths and random positions with respect to other elongated streaks. In addition, the elongated streaks may be darker or lighter in color with respect to the first color, and some embodiments include a third color 28 also formed as elongated streaks extending parallel to the longitudinal axis 30. In the preferred embodiment, the decorative layer of plastic includes three or more visibly differentiable colors, wherein two or more of the differentiable colors are elongated streaks on the outer surface of the decorative panel with the first base color forming the background. The decorative plastic panels 100 may be used for numerous decorative purposes, some of which include counter tops for outdoor bars, table tops, furniture, deck boxes, and outdoor sheds to name a few. In general, the plastic panels 100 can be used in any place where a blow molded panel can be used. The plastic panels are preferably formed by extrusion of plastic pellets followed by blow molding to shape the extruded parison before it cools and hardens forming a hollow component formed of relatively thin outer walls. The outer walls of the preferred embodiment are less than one eighth of an inch thick and may be one sixteenth of an inch thick or less. To provide stiffness to the hollow panels, they may be provided with a plurality of tack-offs. The tack-offs 32 are an indention 34 of the extruded plastic that extends from one of the separated walls to another wall, wherein a portion of the indentation 34 forms an attachment 36 to the inner surface of the other wall. The tack-offs 32 may take almost any shape, so long as an attachment is formed between the two walls of the panel. This construction preferably leaves one wall smooth and free from indentations 34 for use, while a lower or back surface includes the indentations 34 and provides rigidity to the panel. At least some embodiments include tack-off indentations 34 extending inward from both sides of the panel where portions of the panel are hidden to maintain the appearance of the stone or wood on the visible portions of the panel. The edges 20 of the panel 100 may be provided with means for attaching one panel to another.

Still referring to FIGS. 1-9, a method for forming a decorative plastic panel having an outer layer of plastic that resembles stone or wood will be described. In general, a plastic extruder blow molding machine includes a hopper which accepts plastic particles, granules and the like. In the present process, plastic particles that include a first color for use as a base color are mixed with plastic particles of a second color and, in some embodiments, plastic particles having a third or even a fourth or more color are placed into the hopper. The different colors are visibly differentiable with respect to each other to provide a color contrast on the plastic panel. The plastic particles are allowed to feed via gravity to an extrusion screw which rotates to compress, kneed and heat the plastic particles. A portion of the heat occurs from the compression and heating, while a portion of the heat may be provided by various types of heating elements or induction heating. The semi-molten plastic is directed through an extrusion head where the walls are formed as a parison, e.g. a long hollow tube of plastic elevated to a temperature that causes the particles of plastic to bond together and homogenize. The present invention places particles that have a sufficiently different melting temperature that do not homogenize when flowing through the extruder screw, and instead reach a sufficient temperature to cause the second and third color particles to elongate along the surface and through the parison, creating the elongated streaks of different colors. In a preferred embodiment, the second and third color plastic particles include a shape, the shape altering the appearance of the elongated streak. Thus, the plastic particles may include cut cylinders, spheres, discs and the like geometric shapes that include different dimensions as the object is rotated. It is also preferred that the plastic particles used to form the elongated streaks include a higher melting point than the plastic forming the base color. In at least one embodiment, the plastic particles used for the elongated streaks have at least a 10 degree Celsius higher melting point than the plastic particles forming the base color. In other embodiments, the plastic particles used to form the elongated streaks have at least a 25 degree Celsius higher melting point than the plastic particles forming the base color; and in still another embodiment, the elongated streak forming particles of plastic have at least a 40 degree Celsius higher melting point than the plastic particles forming the base color. In this manner, the shape and orientation of the particle causes elongated streaks with different widths and lengths similar to natural stone and wood. The temperature of the particles is sufficient to allow the different materials to bond and blend together along the edges of the elongated streaks. A blow molding die is closed on the parison before compressed air is introduced into the parison to cause the parison to expand to the form of a cavity in the blow molding die, allowing the formed parison to cool sufficiently to retain the shape of the die cavity before opening the die.

Figure 3:
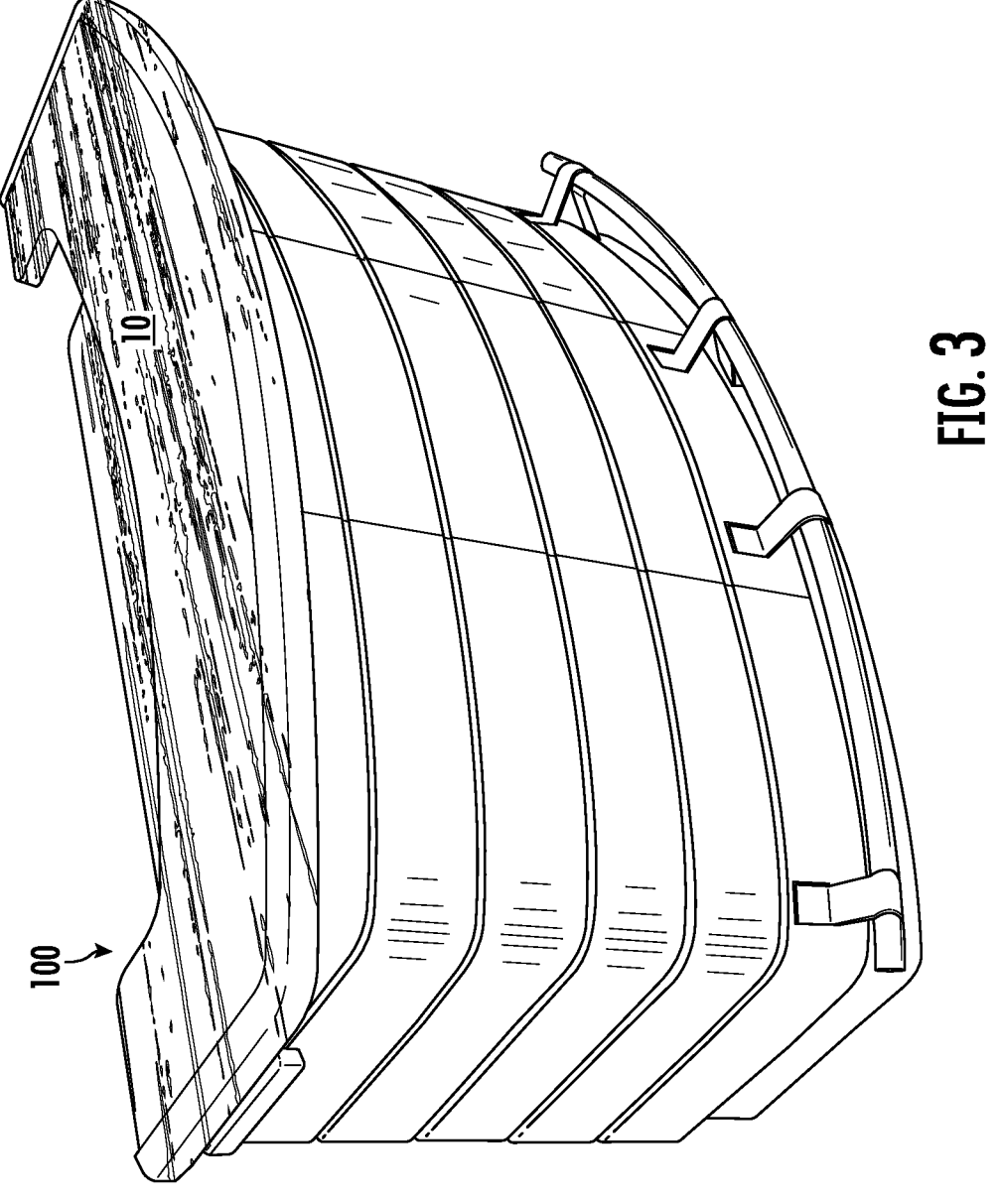
FIG. 3 is a top left front perspective view illustrating a panel having the elongated streak pattern utilized as a counter top.
Figure 4:
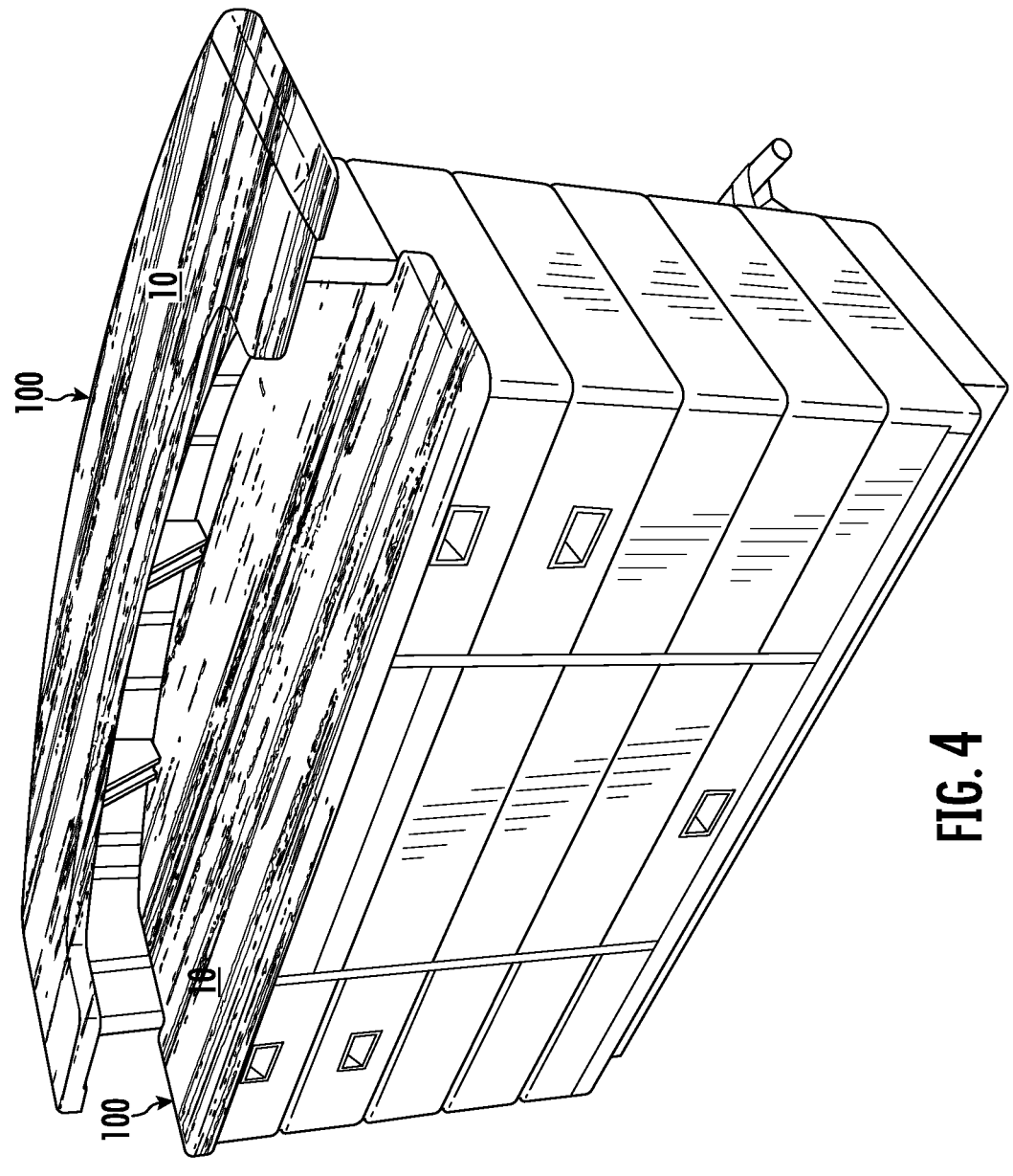
FIG. 4 is a top left rear perspective view of the embodiment illustrated in FIG. 3.
Figure 5:
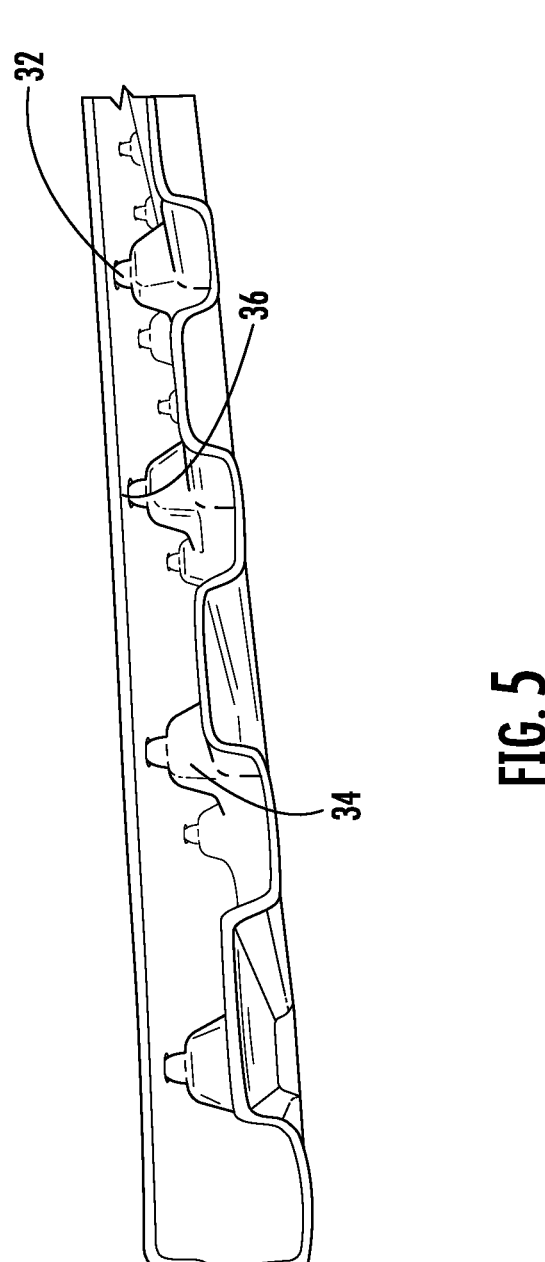
FIG. 5 is a partial cross section view taken along lines 5-5 of FIG. 1 illustrating the tack offs.
Figure 6:
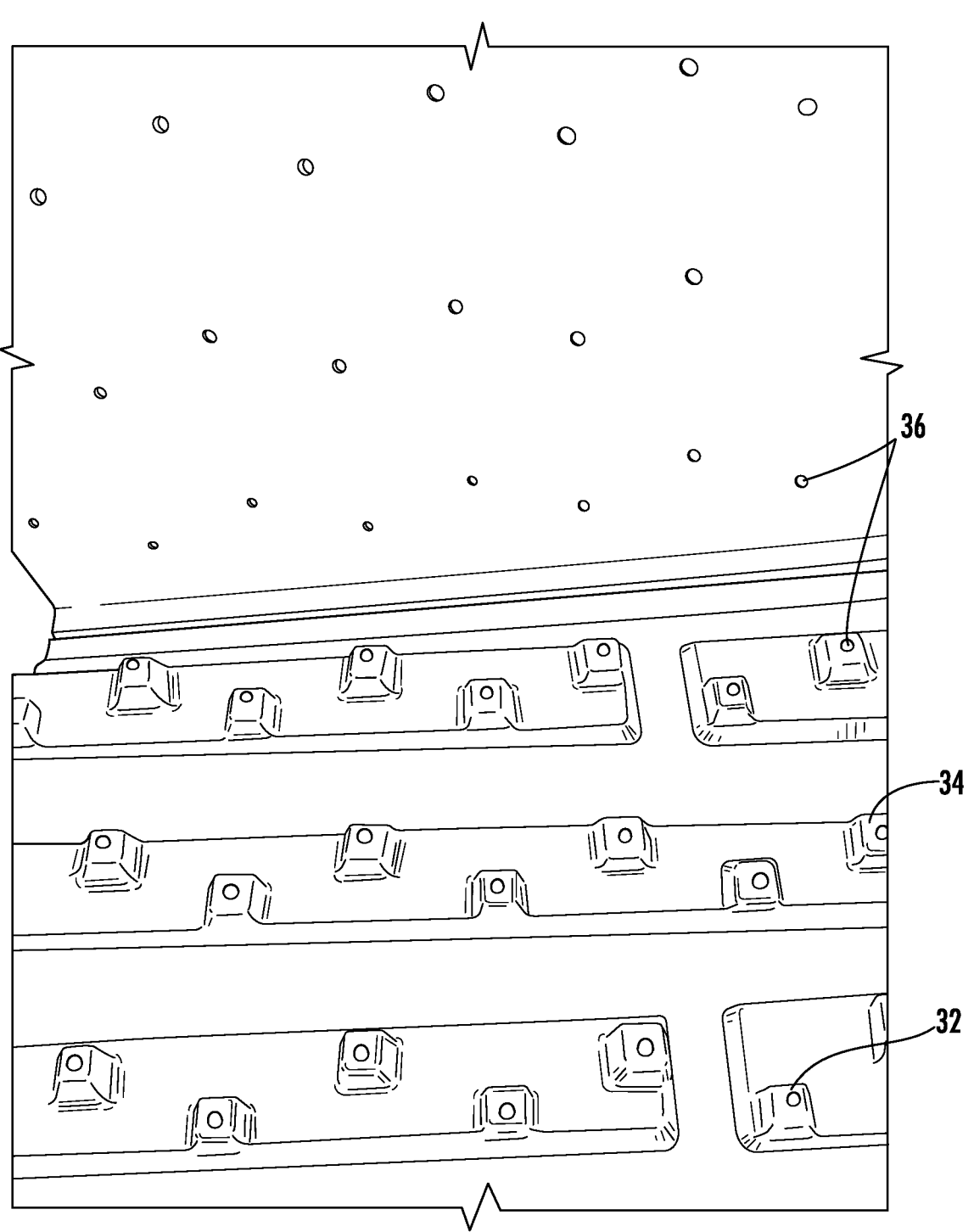
FIG. 6 is a partial perspective view of a panel of FIG. 5, separated to illustrate the construction of the tack offs and the connection to the opposite panel.
Figure 7:
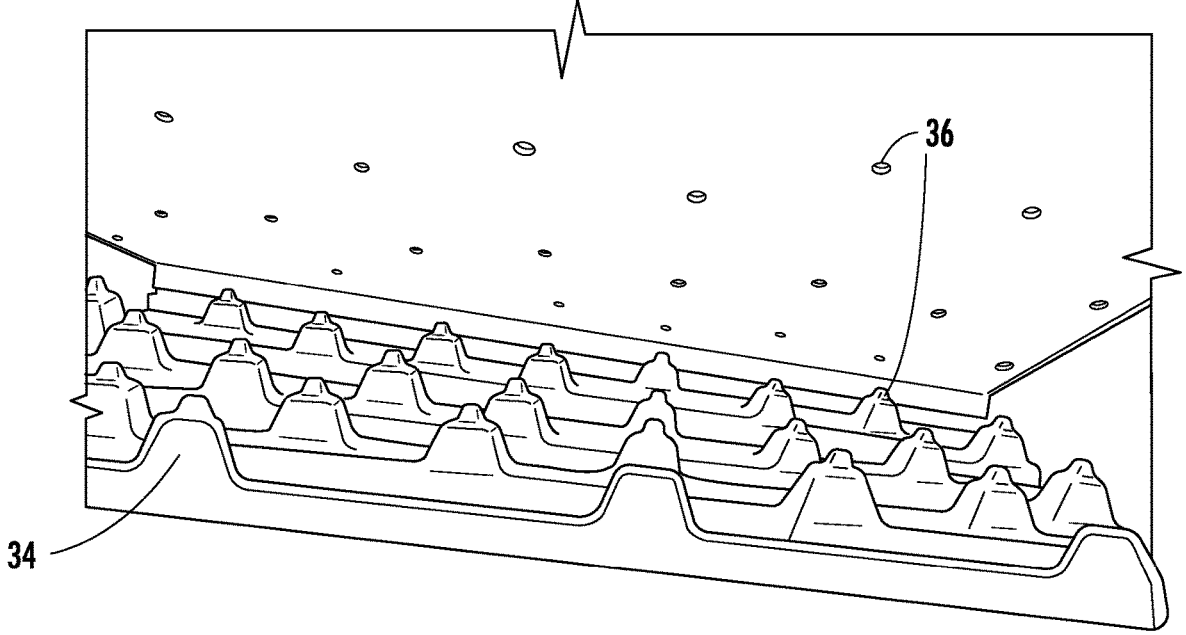
FIG. 7 is a partial view illustrating the front and rear walls of a panel separated to show the construction and connection of the tack offs.
Figure 8:
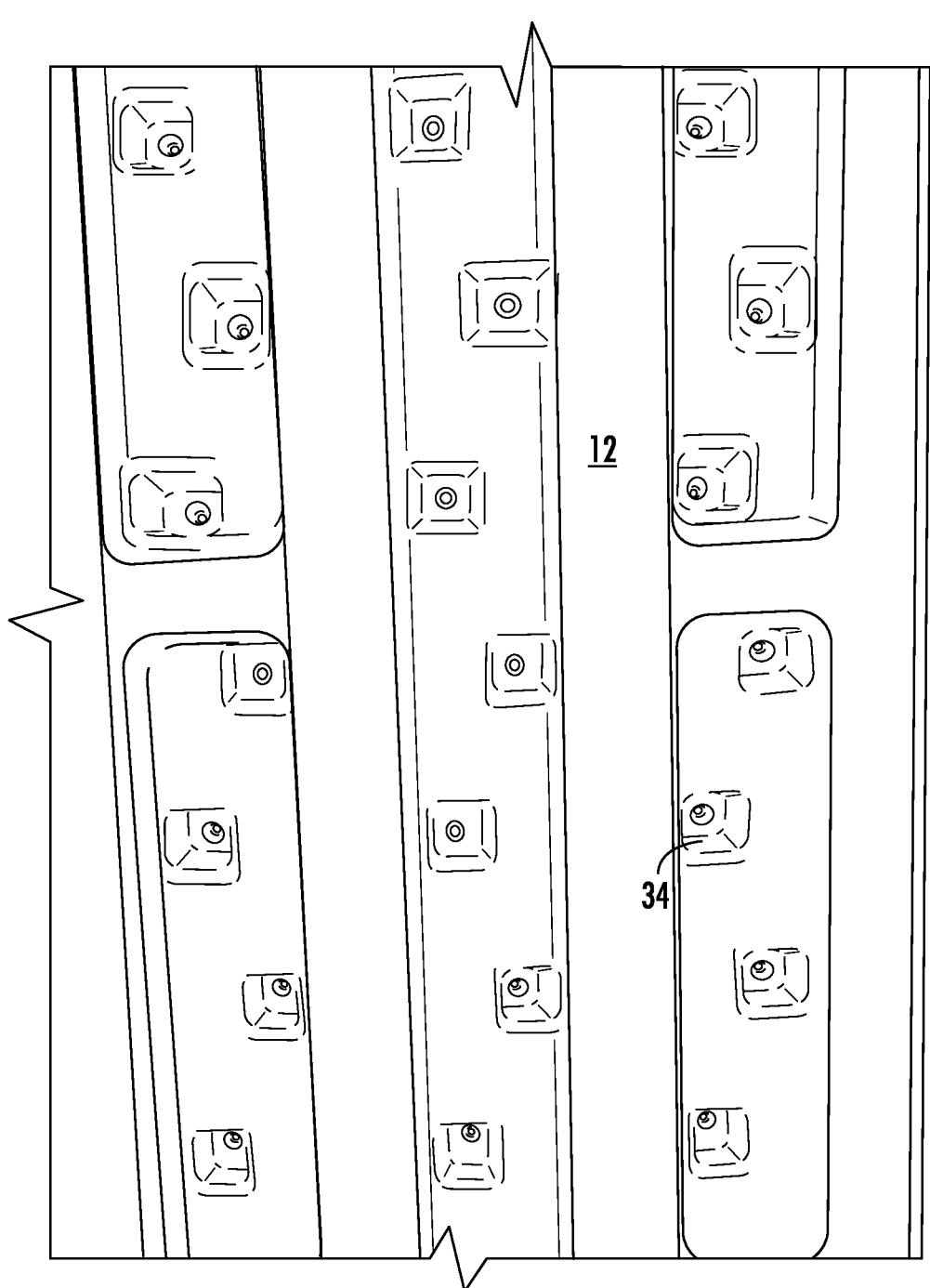
FIG. 8 is a top rear perspective view illustrating the layout of the tack offs.
Figure 9:
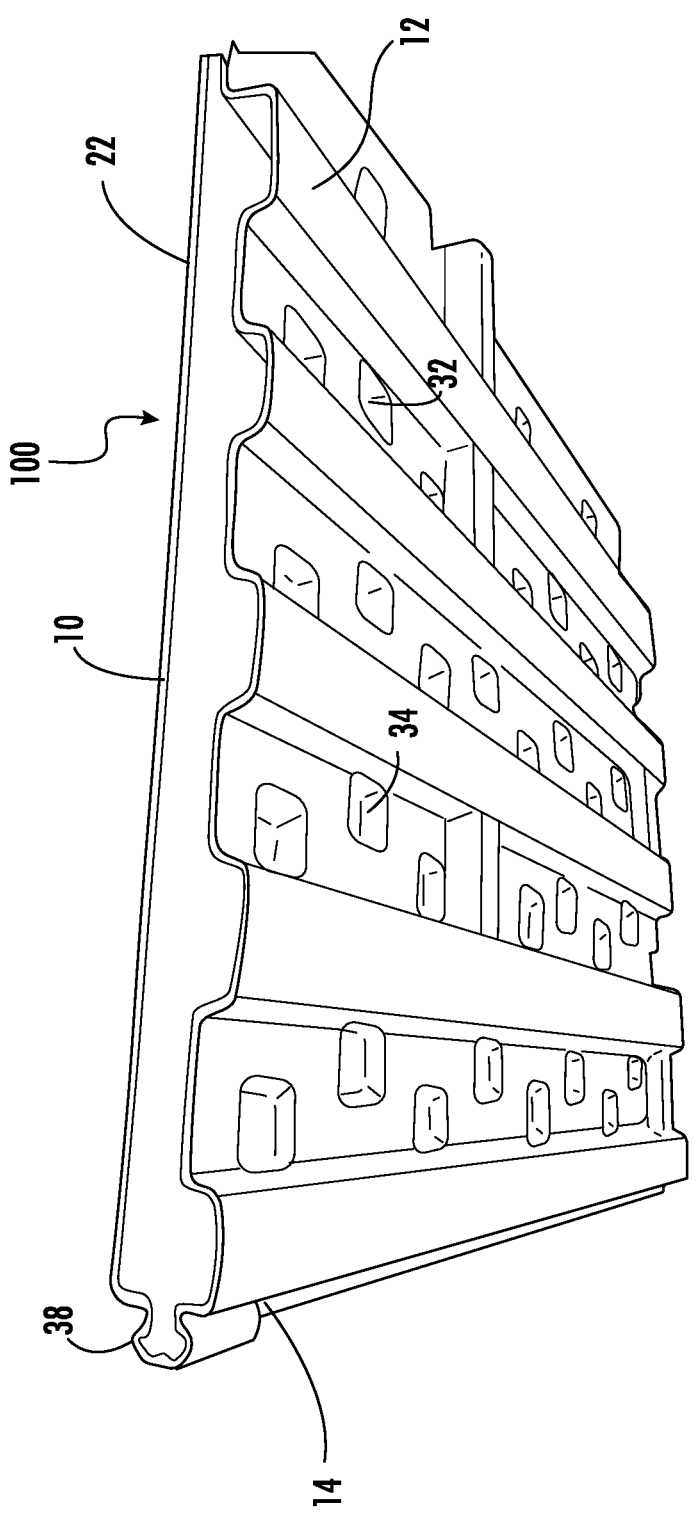
FIG. 9 is a perspective view illustrating the inner wall of the plastic panel.

Referring generally to the figures, and more specifically to FIGS. 3 and 4, the plastic panel 100 is illustrated in use as a counter top for a bar. The plastic panel 100 provides an appealing surface with the appearance of stone, such as marble, without the weight of real stone or the difficulty of manufacture. It should also be noted that while the present specification refers to the term "plastic", resins and the like typically used in the plastics industry are also included herein.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A decorative plastic panel resembling stone comprising:

a hollow panel having a front wall, a rear wall, a pair of side walls, and a pair of end walls, the walls joined along respective edges to construct the hollow panel, an outer surface of each wall including a decorative layer of plastic, the decorative layer including at least two visibly differentiable colors, a first color being a base color forming a preponderance of the decorative layer, a second color forming elongated streaks, the elongated streaks extending parallel to a longitudinal axis of the decorative panel and each elongated streak having different lengths and random positions with respect to other elongated streaks, wherein the second color plastic used to form the elongated streaks has a higher melting point than the plastic forming the base color.

2. The decorative plastic panel of claim 1 wherein the decorative layer of plastic includes three or more visibly differentiable colors, wherein two or more of the differentiable colors are elongated streaks on the outer surface of the decorative panel.

3. The decorative plastic panel of claim 1 wherein the elongated streaks are formed from shaped particles of plastic material during an extrusion process, the extrusion process elongating the plastic particles.

4. The decorative plastic panel of claim 3 wherein the length of the elongated streak is determined by the plastic particle size.

5. The decorative plastic panel of claim 3 wherein the shaped particles are cut cylinders.

6. The decorative plastic panel of claim 3 wherein the shaped particles are spheres.

7. The decorative plastic panel of claim 3 wherein the shaped particles are discs.

8. The decorative plastic panel of claim 3 wherein the width and length of the elongated streak is determined by the orientation of the plastic particle.

9. The decorative plastic panel of claim 1 wherein the elongated streak forming particles of plastic have at least 10 degrees Celsius higher melting point than the plastic particles forming the base color.

10. The decorative plastic panel of claim 1 wherein the elongated streak forming particles of plastic have at least 25 degrees Celsius higher melting point than the plastic particles forming the base color.

11. The decorative plastic panel of claim 1 wherein the elongated streak forming particles of plastic have at least 40 degrees Celsius higher melting point than the plastic particles forming the base color.

* * * * *